No. 672,021. Patented Apr. 16, 1901.
C. O. TAGGS.
WATER STRAINER OR SCREEN.
(Application filed Dec. 3, 1900.)

(No Model.)

Witnesses
George L. Taggs.
Julius Wolf.

Inventor
Charles O. Taggs

By Franklin D. Hardy. Atty.

UNITED STATES PATENT OFFICE.

CHARLES O. TAGGS, OF CHICAGO, ILLINOIS.

WATER STRAINER OR SCREEN.

SPECIFICATION forming part of Letters Patent No. 672,021, dated April 16, 1901.

Application filed December 3, 1900. Serial No. 38,585. (No model.)

*To all whom it may concern:*

Be it known that I, CHARLES O. TAGGS, a citizen of the United States, residing at Chicago, in the county of Cook, State of Illinois, have invented certain new and useful Improvements in Water Strainers or Screens, of which the following is a clear and exact description, reference being had to the accompanying drawings, which form a part of this specification.

My invention relates more particularly to screens used in filters for preventing the filtering material, such as sand, from passing out with the filtered water when in operation.

The object of my invention is to provide a screen simple in its construction and more effectual in its operation and more durable than screens heretofore produced. I attain said object by the construction shown in the accompanying drawings, in which—

Figure 1:
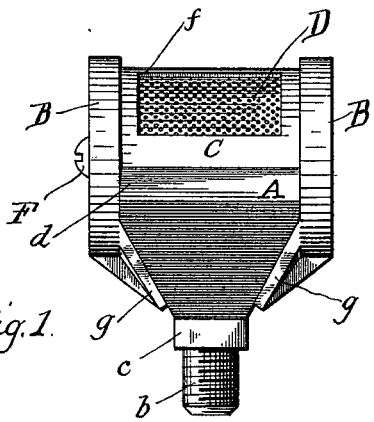
Figure 2:
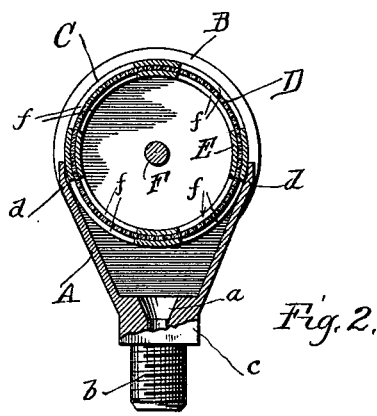
Figure 3:
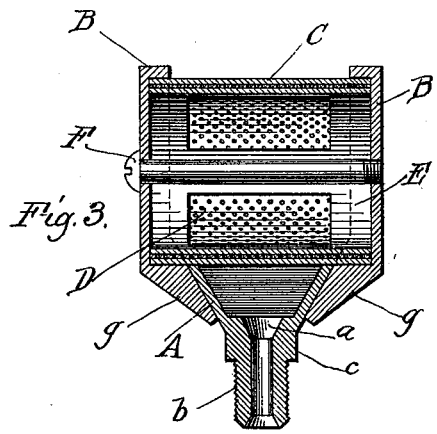
Figure 4:
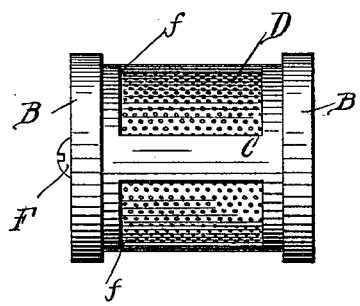
Figure 5:
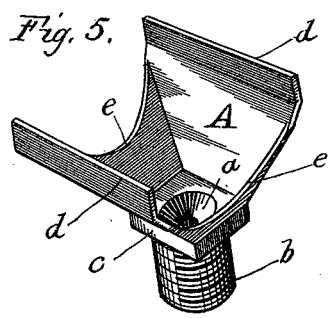
Figure 6:
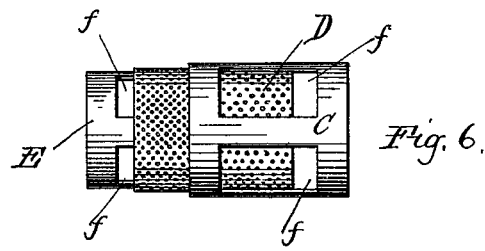
Figure 7:
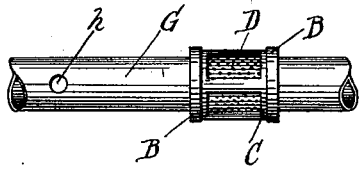

Figure 1 is a side elevation of my screen as it appears when complete. Fig. 2 is a vertical and central cross-section showing the threaded end of the bottom part in full. Fig. 3 is a vertical and central longitudinal section showing the screw or bolt which holds the screen together in full. Fig. 4 is a plan view showing more clearly the two perforated openings formed in the top of the screen. Fig. 5 is a detail of the bottom part of the screen, showing an opening down through the threaded end of the same. Fig. 6 is a detail of the cylindrical part of my screen, showing the manner of forming the perforated openings therein. Fig. 7 is a reduced plan view of one of my screens attached to a piece of pipe and showing another opening produced in said piece of pipe to receive another screen in the manner used in filters.

In referring to the drawings like letters refer to like parts throughout the several views.

In the drawings, A represents the bottom part of my screen, being provided with the hole $a$ down through the threaded end $b$, the square shoulder $c$, the flaring sides $d\ d$, and the curved-out ends $e\ e$, as shown in Fig. 5.

B B are the heads or caps, provided with the lugs $g\ g$ and a hole in the center of each of said caps to admit of a screw or bolt, as shown in Fig. 3.

C is a cylindrical-shaped piece of metal of a suitable length and diameter and being provided with four openings $f\ f\ f\ f$, formed in its circumference.

D is a tubular-shaped piece of perforated metal of a suitable length and diameter, as shown in Fig. 6.

E is a cylindrical-shaped piece of metal of a suitable length and diameter and being provided with four openings formed in its circumference and corresponding with the openings $f\ f\ f\ f$, formed in C.

F is a screw or bolt used to hold my screen together.

G is a piece of pipe with one of my screens attached and being provided with the hole $h$ to admit of attaching another screen.

In constructing my screen the parts shown in Fig. 6 being of same length and suitable diameter are forced together, the perforated metal being between the inner and outer pieces, thereby forming the four perforated openings in the cylindrical part of my screen, as shown in section in Figs. 2 and 3. Said cylindrical part being of suitable length and diameter is then placed in the curved-out ends $e\ e$ and fits between the flaring sides $d\ d$, thereby forming a chamber in A, into which the two bottom perforated openings terminate, the other two of said perforated openings being on top, all as shown in section in Fig. 2. The caps B B are then placed over the ends of the cylindrical part, with the lugs $g\ g$ at the bottom. The bolt F is then inserted. It will be readily seen that as the bolt F is tightened the caps B B are drawn together and the lugs $g\ g$ come in contact with the flaring ends of A, thereby securely bolting the entire screen together, as shown in Figs. 1 and 3.

When in operation, one or more of my screens are attached to one or more of the outlet-pipes commonly used in filters in the manner shown in Fig. 7.

The construction of filters referred to is obvious, as it is well known that said filters have an arrangement of pipes and screens and are partly filled with sand or other filtering material. Said filtering material being of larger dimension than the perforation in my screen is thereby held in check, while the water enters freely through the two perforated openings in the top of the screen and passes out through the two openings terminating in the chamber formed in A and thence down through the opening $a$ into the outlet-pipes.

I do not confine myself to the identical construction shown, as in some instances I dispense with the inner cylindrical-shaped piece E and in some instances with both the inner cylindrical-shaped piece E and the outer cylindrical-shaped piece C, using only the tubular-shaped piece of perforated metal D, being formed of a suitable diameter, thereby increasing the filtering capacity of my screen without enlarging the other parts; nor do I confine myself to the number of openings shown and described in C and E, as any number may be used and of various shapes; but What I do claim as new, and desire to secure by Letters Patent, is—

1. In a water strainer or screen as herein described the combination of the chambered piece A, the cylindrical-shaped piece C, the tubular perforated piece D, the cylindrical-shaped piece E, the bolt F, and the caps or heads B, B, all as provided and for the purpose stated.

2. In a water strainer or screen the combination of the chambered piece A, the tubular-shaped piece of perforated metal D, being of suitable diameter, the heads or caps B, B, and the bolt or screw F, as and for the purpose stated.

CHARLES O. TAGGS.

Witnesses:
GEORGE L. TAGGS,
JULIUS WOLF.